March 20, 1951 A. B. CHUDYK 2,545,650
TORQUE INDICATOR
Filed July 3, 1944 2 Sheets-Sheet 1
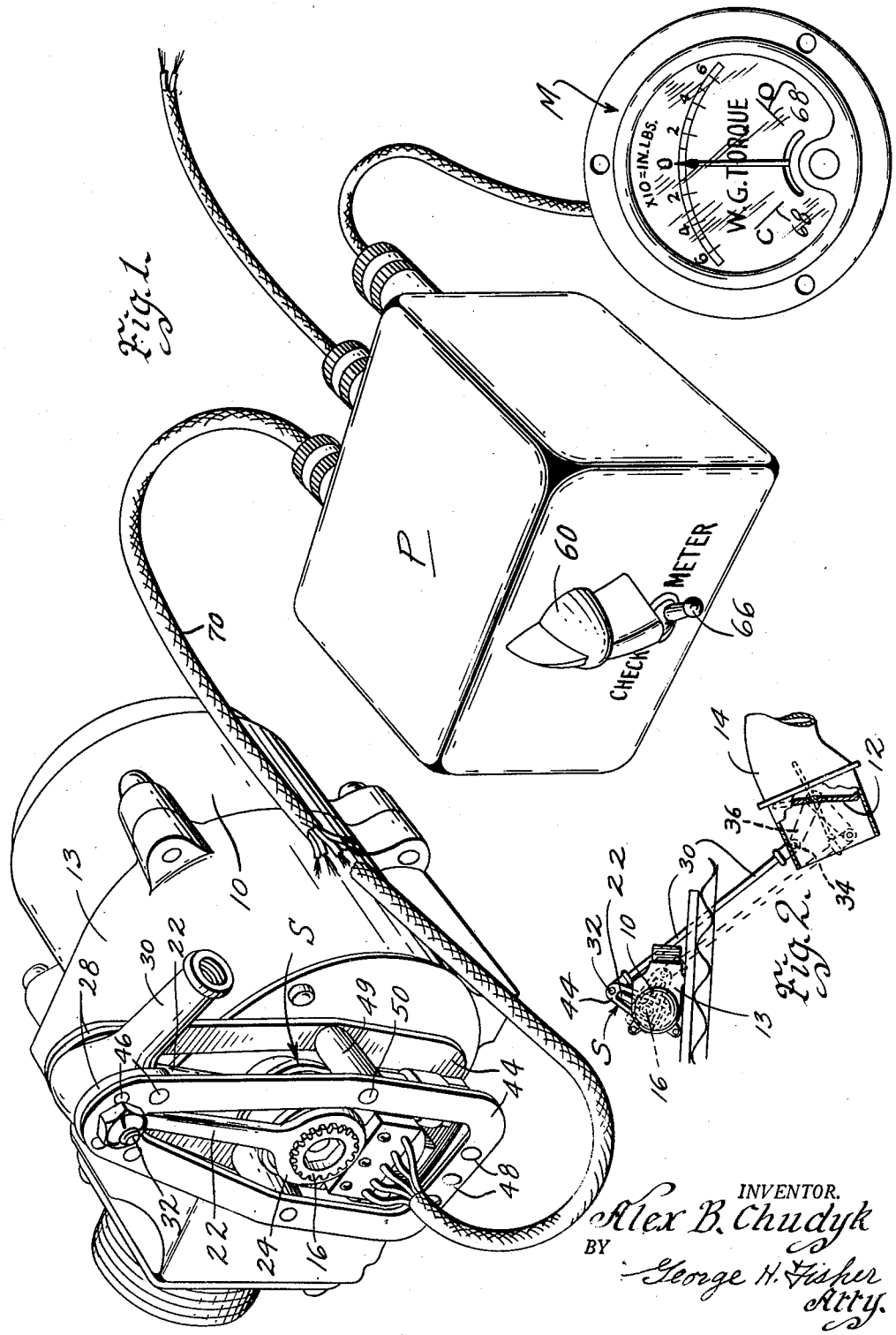
INVENTOR.
Alex B. Chudyk
BY George H. Fisher
Atty.

March 20, 1951 A. B. CHUDYK 2,545,650
TORQUE INDICATOR
Filed July 3, 1944 2 Sheets-Sheet 2
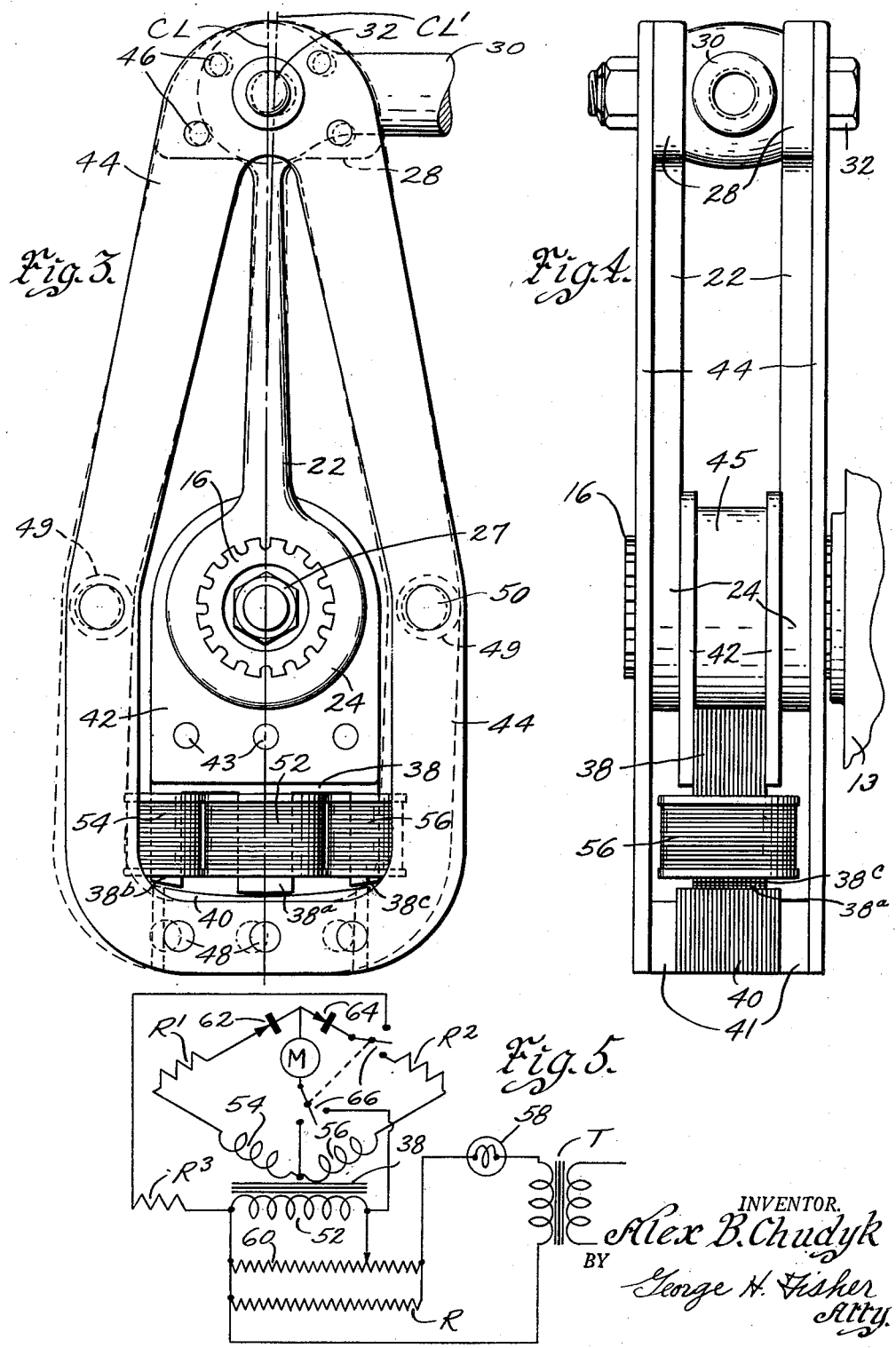
INVENTOR.
Alex B. Chudyk
BY George H. Fisher
Atty.

Patented Mar. 20, 1951

2,545,650

UNITED STATES PATENT OFFICE 2,545,650

TORQUE INDICATOR

Alex B. Chudyk, Hopkins, Minn., assignor to Minneapolis-Honeywell Regulator Company, Minneapolis, Minn., a corporation of Delaware Application July 3, 1944, Serial No. 543,300

14 Claims. (Cl. 73—136)

1

This invention relates to an instrument for measuring and indicating the torque existing at a motor shaft and indicates the torque as caused by motion of the shaft and/or a reactive force opposing the movement of the shaft.

One object of the invention is to provide a novel type of sensing element for the torque indicator which may be made inexpensively yet of rugged characteristics so as to minimize distortion of the torque arm through which the force is transmitted to a device such as a valve or the like.

Another object is to provide a sensing element which includes in its make-up a spring torque arm attached rigidly to a shaft, the torque of which is to be measured, and having a connection to a link or the like which in turn is connected to a device to which the torque of the shaft is applied, the sensing unit including a pair of sensing elements, one carried by the shaft and the other carried by a head on the outer end of the torque arm.

Still another object is to locate the sensing elements with relation to the head of the torque arm so that without a complicated lever system, very slight deflection of the torque arm results in a movement of one sensing element relative to the other, which movement is of considerable magnitude.

A further object is to provide the sensing elements in the form of an E-shaped core and an armature with the armature moved relative to the core so that when an exciter coil on the center leg of the core is energized and pick-up coils on the other two legs are connected with a centered-zero meter, the direction and magnitude of the applied torque may be read directly on the meter.

Still a further object is to provide a torque indicator including a sensing element which is particularly adapted for mounting on the shaft of a waste gate motor of a turbo supercharger so that the torque applied to the waste gate may be tested under all actual operating conditions and data can be secured with respect to the demand placed on the waste gate motor to thereby determine the sufficiency of the available motor torque as well as to determine actual torque conditions existing under various conditions of altitude, temperature, waste gate position, etc.

It is a further object to provide a sensing unit which can temporarily replace the standard torque arm of a waste gate motor or the like and a metering unit for use in connection therewith which may, together with a power unit, be positioned at a convenient point for manipulation and reading, such as in the pilot's cabin while testing the required torque for operation of the waste gate. Maximum torque required can thereby be determined so that a minimum

2 size motor can be used and a saving in both weight and expenditure of electrical current for operation of the motor can be effected.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a perspective view of a torque indicator including a sensing unit, a power unit and a metering unit.

Figure 2 is a diagrammatic view showing the application of the sensing unit to a waste gate motor, the motor being illustrated connected with a waste gate of a turbo supercharger.

Figure 3 is a front view of the sensing unit of my present invention and showing it on the waste gate motor shaft.

Figure 4 is a side elevation of Figure 3 and Figure 5 is an electro-diagrammatic view of one form of bridge circuit which may be used in connection with my torque indicator.

On the accompanying drawings I have used the reference character S to indicate in general a sensing unit, P a power unit and M a metering unit of my torque indicator. In Figure 1 the sensing unit is shown mounted on the shaft 16 of a waste gate motor 10, although it may be used in connection with any oscillatable shaft, the torque of which is to be measured and which applies the torque through an arm of the shaft and a link connection or the like from the arm to a device to which the torque is to be applied.

By way of illustration, Figure 2 shows a waste gate 12 in the form of a butterfly valve in the spillway 14 from an exhaust gas operated turbine that drives an impeller of a turbo supercharger. When the waste gate is closed the exhaust gases act fully upon the turbine to rotate it at high speed while varying degrees of opening the butterfly 12 result in by-passage of the exhaust gases so that the turbine and impeller are rotated at relatively slower speeds. The waste gate motor 10 may operate the torque arm through step-down gearing 13 and may be controlled manually and/or automatically in accordance with altitude, engine temperature, manifold pressure, etc. and in a modulated manner all of which forms no part of my present invention.

My sensing element S comprises a pair of torque arms 22 which are preferably formed of metal and are therefore somewhat resilient so that they may deflect under torque. The arms 22 have hubs 24 which are secured as by splining them to a shaft, the torque of which is to be measured. By way of illustration the shaft is shown as shaft 16 of the waste gate motor 10. The outer ends of the arms 22 are provided with heads 28 which upon torque increase rotate in relation to the hubs 24 and shaft 16 as indicated by the dotted showing in Figure 3. With no load on the arm when it swings, the heads would not rotate relative to the hubs, but upon load being imposed, the arms will bend as indicated by the dotted lines thus resulting in rotation of the head relative to the hub as above stated. A normal center line CL and a bent center line CL' are shown to illustrate the difference.

Under actual operating conditions the bending occurs as a result of the load of the butterfly 12 being imposed on the spring arms 22 by a link 30 pivoted at 32 to the spring arms and at 34 to a butterfly operating arm 36.

The sensing elements of the sensing unit S consist of an E-shaped core 38 and an armature 40. The E-shaped core is rigid relative to the hubs 24 as by being riveted to a pair of plates 42 splined on the shaft 16. The armature 40 is mounted in rigid relation to the torque arm heads 28 by means of a pair of yoke plates 44 connected with the heads by rivets 46 and with the armature by rivets 48. Suitable spacers 49 and rivets 50 serve to hold the yoke plates in assembled relation and properly spaced intermediate their upper and lower ends. The arrangement is such that the air gap between the sensing elements is on the side of the shaft 16 opposite the heads 28 to get a maximum of magnified movement in a sensing unit that is substantially balanced on opposite sides of the shaft. With this arrangement the distance between the locus of flexure of arms 22 and the pivot pin 32 is less than the distance between the locus of flexure of arms 22 and the sensing elements. The adjacent surfaces of the core 38 and the armature 40 between which the air gap is located are formed on an arc struck from a point substantially midway between the axis of the shaft 16 and the pivot pin 32 so as to maintain a substantially equal air gap in all positions of deflection as will be obvious by comparing the dotted showing in Figure 3 with the full line showing.

Wound on the center leg 38a of the E-shaped core 38 is an exciter coil 52 and on the other two legs 38b and 38c are pick-up coils 54 and 56. The exciter coil may be energized from a suitable transformer T (see Figure 5) with alternating current such as 115 volts at 400 cycles. To minimize the effects of line voltage fluctuations applied to the exciter coil 52, a ballast type voltage regulator tube 58 may be employed. A potentiometer 60 may then be used in connection with a resistor R for the purpose of varying the voltage during checking of the meter M as will hereafter appear.

The pick-up coils 54 and 56 are included in a bridge circuit as shown in Figure 5, the coils forming two arms of the bridge and the other two arms having resistors R1 and R2 and rectifiers 62 and 64 therein. The meter M is connected in a circuit across the bridge.

For checking the meter M, a double-pole double-throw switch 66 is provided which, when swung to the left, will connect the meter for indicating torque as signalled to it by the coils 54 and 56 while movement of the switch to the right will enable the voltage fed to the exciter coil 52 to pass directly through the meter and the rectifier 64 for checking the meter and thereby making sure that it is giving correct readings. This may be determined by observing whether the needle swings to register with one of the check marks 68 when the switch 66 is thrown toward the right or to "check" position. A resistor R3 is provided in the check circuit to keep the meter M on scale during the checking operation.

The meter may be graduated in terms of inch pounds of torque, the one in Figure 1 being for a maximum of 65. By using a D. C. meter such as one of the milliammeter type, both the direction and the magnitude of the torque can be indicated and yet the exciter coil 52 can be energized with A. C. for inducing secondary currents in the coils 54 and 56. By then including the rectifiers 62 and 64 in the bridge circuit, D. C. is supplied to the meter so as to give direction reading as well as magnitude reading.

My sensing unit is so constructed that it gives sufficient rigidity to minimize vibration and distortional movement of the torque arm 22. The sensing elements 38 and 40 may move relative to each other as much as $\tfrac{1}{16}''$ each way with very little bending of the torque arms. The bending is shown exaggerated in Figure 3 merely for purposes of illustration. With the torque arm arrangement disclosed, deflection is linear in relation to torque applied. There is no introduction of friction or mechanical hysteresis and the sensing arrangement is therefore adequate to meet the conditions required.

A static check of the scale length on the meter M is possible by movement of the switch 66 to "check" position when there is no torque load present. At that time, the potentiometer 60 is adjusted until correct reading (needle registering with the check mark 68) is had. The sensing unit responds to force on the link 30 in both directions, whether exerted by the motor or as a reactive force by the waste gate 12. The core and armature arrangement is such that there is a current increase in one pick-up coil and a corresponding decrease in the other one due to one end of the armature 40 moving closer into the center of the magnetic field of one leg 38b or 38c while moving farther out of the field of the other. The relative displacement is therefore additive and effects a maximum of needle movement in the meter per unit of armature displacement with respect to the core.

The torque indicator disclosed is particularly adapted for testing torque under actual flight conditions and for this purpose may have a relatively long cable 70 from the sensing unit to the power unit P. The power unit is preferably located adjacent the pilot and so is the meter M so that the potentiometer 60 may be adjusted and the change-over switch 66 manipulated while observing the reading on the meter M. The sensing unit is temporarily used to replace the normal torque arm on the shaft of the waste gate motor 10 and the tests are made under flight conditions including all altitudes, engine speeds, manifold pressures, etc.

Comprehensive values of torque demand placed on the motor are thereby obtained and the torque readings taken, as well as the position of the torque arm during each reading, so that the data lends itself to analysis of the origin of the torque indicated as well as the sufficiency of the available motor torque. From the data gathered it is also possible to determine the maximum power needed for the motor so that a maximum size of motor compatible with requirements may be determined, thus keeping weight down to a minimum which is a serious consideration in connection with apparatus used in airplanes.

The "check" of the meter M is preferably observed several times during a flight to make sure that the meter readings are correct and do not drift out of accuracy due to voltage change or other varying conditions of operation. If ambient temperature affects the meter M, suitable correction charts or temperature curves can be used for correcting the reading.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a torque indicator of the character disclosed, a spring arm having a hub for attachment to a shaft, the torque of which is to be measured, said arm having on its outer end a head, a connection between said head and a device to which torque is applied by said shaft, and sensing means comprising a pair of relatively movable sensing elements, one of which is an E-shaped core secured to said shaft, and the other of which is an armature secured to said head and movable relative to said core, an exciter coil on the center leg of said E-shaped core, a pair of pick-up coils, one on each of the other legs of said core, and means for supporting said armature in rigid relation to said head whereby flexing of said arm in response to torque changes results in rotation of said head in relation to said shaft, thereby effecting magnified movement of said armature relative to said E-shaped core, and effecting an increase in secondary current in one of said pick-up coils while effecting a decrease in secondary current in the other one.

2. In a torque indicator of the character disclosed, a spring arm having a hub for attachment to a shaft and having on its outer end a head, a connection between said head and a device to which torque is applied by said shaft, and sensing means comprising a pair of relatively movable sensing elements, one of which is a core secured to said shaft, and the other of which is an armature supported by said head, movable therewith by a swinging motion with the head as a pivot and movable relative to said core, supporting means for said armature comprising arms extending from the head and past the shaft to said armature, said arms being free of said shaft and free to move toward and away from it, said core and armature having an air gap therebetween located at a point spaced from said shaft which point is on the side of the shaft opposite said arm and its head.

3. A torque indicator comprising a spring arm having one end attached to a shaft and a head on its other end and capable of rotation independent of said shaft and on an axis of the head itself parallel to the axis of said shaft, a connection from said head to a device to which torque is applied, and sensing means comprising a pair of relatively movable sensing elements, one of which is connected to the shaft for rotation therewith and with said arm, and the other of which is supported in rigid relation with respect to said head, supporting means comprising arms extending from said head to said other sensing element and included as a part of the sensing means, one of said sensing elements comprising an armature and the other a core provided with exciter and pick-up coils, and an indicator connected with said pick-up coils to indicate the direction and magnitude of torque by displacement of said armature relative to said core.

4. In a torque indicator, a flexible arm having one end attached to a shaft, and sensing means comprising a pair of relatively movable sensing elements one of which is connected to the shaft for rotation therewith and located opposite said arm, and the other of which is supported in rigid relation with respect to said head, extends past and is free of said shaft and terminates beyond the first sensing element, one of said sensing elements comprising an armature and the other a core provided with exciter and pick-up coils.

5. In a torque indicator, an arm having one end attached to a shaft, a connection from its other end to a device to which torque is applied, said arm being capable of flexing in accordance with the torque, and sensing means comprising a pair of relatively movable sensing elements, one of which is connected to the shaft for rotation therewith and located opposite said arm, and the other of which is supported in rigid relation with respect to said head, extends past said shaft with clearance between it and the shaft and terminates beyond the first sensing element.

6. A torque indicator comprising a pair of elastic arms having one end attached to a shaft and having heads on the other end, a connection from said heads to a device to which torque is applied, and sensing means comprising a pair of relatively movable sensing elements, one of which is connected to the shaft between said arms and extends in a direction opposite said arms, and the other of which is supported in rigid relation with respect to said heads, supporting means for said other sensing element comprising a pair of yokes outside said arms and extending past them and past said shaft, an armature mounted between said yokes, one of said sensing elements comprising said armature and the other a core provided with exciter and pick-up coils.

7. A torque indicator comprising a pair of spring arms for attachment to a shaft, the torque of which is to be measured and arranged in spaced relation in a plane passing through the axis of the shaft, said indicator having a sensing means comprising a pair of relatively movable sensing elements, one connected with said shaft in the space between said arms and extending in a direction from said shaft opposite said arms, and the other sensing element located beyond the first sensing element, and means for supporting said other sensing element in rigid relation to the outer ends of said arms whereby flexing of said arms results in rotation of said outer ends in relation to said shaft to effect magnified movement of said second sensing element relative to said first sensing element and laterally relative to said shaft, said last means comprising a pair of yokes having said other sensing element located between them.

8. A torque indicator comprising a flexible arm having one end constituting an attachment end and its other end fixed to a shaft, the torque of which is to be measured, said flexible arm having a second arm attached to said attachment end and extending in a direction toward and beyond said shaft to terminate in a sensing element opposite said attachment end, said second arm passing said shaft and being movable toward and away from it, a second sensing element located adjacent the first sensing element, and means for supporting said second sensing element in rigid relation to said shaft whereby flexing of said flexible arm results in rotation and circumferential movement of said attachment end in relation to said shaft to effect movement of said second arm toward or away from said shaft and resultant magnified movement of said first sensing element relative to said second sensing element.

9. In a torque indicator, a spring arm having a hub at one end adapted for attachment to a shaft and a head at its other end, a sensing means comprising a pair of relatively movable sensing elements, one of said sensing elements being connected with said shaft, means free of said shaft and extending from the other sensing element to said head for rigidly supporting said other sensing element in relation thereto and solely thereby, whereby flexing of said spring arm results in circumferential movement and rotation of said head in relation to said hub to effect movement of said supporting means laterally of said shaft and movement of said second sensing element relative to said first sensing element.

10. A torque indicator comprising a spring arm having at one end a hub for attachment to a shaft, the torque of which is to be measured, and at its other end a head, sensing means comprising a pair of relatively movable sensing elements, one connected with said hub and extending in a direction from said shaft opposite said arm and the other adjacent the first sensing element, and means extending from said other sensing element to said head for supporting said other sensing element in rigid relation to said head, said last means passing said shaft and movable laterally thereof whereby flexing of said spring arm results in circumferential movement and rotation of said head in relation to said hub to effect swinging of said supporting means about said head and laterally of said shaft to thereby effect magnified movement of said second sensing element relative to said first sensing element.

11. In a torque indicator, an arm element for attachment to a shaft, the torque of which is to be measured, said arm element being capable of flexion under load and having on its outer end a head element, a connection between said head element and a device to which torque is applied by said shaft, and sensing means comprising a pair of relatively movable sensing elements, one of which is mounted on said shaft and the other of which is supported solely by said head element, means for connecting said head element and said last mentioned element together, one of said sensing elements being an E-shaped core and the other being an armature movable relative to said core, said core and armature being located on the opposite side of said shaft from said head element, an exciter coil on the center leg of said E-shaped core, a pair of pick-up coils, one on each of the other legs of said core whereby flexion of said arm element in response to torque changes results in rotation of said head element in relation to said shaft, thereby effecting an increase of induced current in one of said pick-up coils while effecting a decrease of induced current in the other one, and an electrically operated indicator energized by said pick-up coils.

12. In a torque indicator of the character disclosed, a flexible arm rigidly secured at one extremity to a shaft and secured at the other extremity to a device to which torque is applied by said shaft, sensing means comprising a pair of relatively movable sensing elements in operative relationship, one of which is a core and the other an armature, one of said elements being rigidly connected to said shaft, means rigidly connecting the other of said elements to said flexible arm remote from said shaft, the distance between the locus of flexure of said arm and said device secured to said arm being less than the distance between the locus of flexure of said arm and the sensing elements, thereby to provide magnified relative movement between said sensing elements as said arm flexes in response to torque applied to said device.

13. In a torque indicator, a flexible arm having one end attached to a shaft, said arm having a locus of flexure intermediate its extremities, means attached to the other end of said arm to transmit torque applied to said shaft, and sensing means comprising a pair of relatively movable sensing elements, one of which is rigidly connected to said shaft for rotation therewith and the other of which is in operative relationship with said first named sensing element and rigidly connected with respect to said torque transmitting end of said arm remote from and free of said shaft, said elements being so positioned that the distance between the locus of flexure of said arm and said transmitting end of said arm is less than the distance between the locus of flexure of said arm and said sensing elements.

14. In a torque indicator of the character disclosed, a spring arm having a locus of flexure and a hub attached to a shaft, the torque of which is to be measured, a device to which a torque is applied by said shaft, said device being operatively connected with said spring arm remote from said hub, and sensing means comprising a pair of relatively movable sensing elements in operative relationship, one of which is an E-shaped core and the other of which is an armature, one of said sensing elements being supported in rigid relation to said shaft near said hub, the other of said sensing elements being supported in rigid relationship to said spring arm remote from said hub, an exciter and a pair of pickup coils on the legs of said core, the distance between the locus of flexure of said spring arm and the operative connection of said spring arm to said device being less than the distance between the locus of flexure of said arm and the elements of said sensing means, whereby said spring arm upon flexing in response to torque effects magnified relative movement between said sensing elements varying the current in the pickup coils.

ALEX B. CHUDYK.

REFERENCES CITED

The following references are of record in the file of this patent:

UNITED STATES PATENTS

| Number | Name | Date |
| --- | --- | --- |
| 832,064 | Keeler | Oct. 2, 1906 |
| 2,173,039 | Muir | Sept. 12, 1939 |
| 2,231,240 | Zimmerman | Feb. 11, 1941 |
| 2,283,888 | Zimmerman | May 19, 1942 |
| 2,319,299 | Converse | May 18, 1943 |
| 2,336,371 | Shayne et al. | Dec. 7, 1943 |
| 2,348,098 | Storrie | May 2, 1944 |

FOREIGN PATENTS

| Number | Country | Date |
| --- | --- | --- |
| 630,368 | Germany | May 28, 1936 |
| 675,755 | Germany | May 16, 1939 |